(12) United States Patent
Sakurai

(10) Patent No.: US 10,558,411 B2
(45) Date of Patent: Feb. 11, 2020

(54) SERVER APPARATUS, METHOD OF CONTROLLING THE SERVER APPARATUS, STORAGE MEDIUM, AND PRINTING SYSTEM THAT DETERMINE WHETHER TO PERFORM, IN THE SERVER APPARATUS, RENDERING PROCESSING ON A PAGE OF A PRINT JOB

(71) Applicant: CANON KABUSHIKI KAISHA, Tokyo (JP)

(72) Inventor: Masakatsu Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/998,861

(22) Filed: Aug. 17, 2018

(65) Prior Publication Data
US 2019/0065128 A1 Feb. 28, 2019

(30) Foreign Application Priority Data
Aug. 28, 2017 (JP) .................. 2017-163668

(51) Int. Cl.
*G06F 3/12* (2006.01)
(52) U.S. Cl.
CPC .......... *G06F 3/1261* (2013.01); *G06F 3/1204* (2013.01); *G06F 3/1215* (2013.01); *G06F 3/1259* (2013.01); *G06F 3/1288* (2013.01); *G06F 3/1273* (2013.01); *G06F 3/1286* (2013.01)

(58) Field of Classification Search
CPC .... G06F 3/1261; G06F 3/1215; G06F 3/1204; G06F 3/1259; G06F 3/1273; G06F 3/1286; G06F 3/1288
USPC ........................................................ 358/1.15
See application file for complete search history.

(56) References Cited

U.S. PATENT DOCUMENTS

| 8,237,947 B2 | 8/2012 | Sakurai | |
|---|---|---|---|
| 2002/0181010 A1* | 12/2002 | Pineau | G06F 3/1292 358/1.15 |
| 2018/0165046 A1* | 6/2018 | Inoue | G06F 3/1238 |

FOREIGN PATENT DOCUMENTS

JP 2012-186555 A 9/2012

* cited by examiner

*Primary Examiner* — Tammy Paige Goddard
(74) *Attorney, Agent, or Firm* — Venable LLP

(57) ABSTRACT

A server apparatus includes a controller that determines, for a page of a held print job, whether or not to perform rendering processing in the server apparatus, performs, in accordance with a result of the determination, the rendering processing on a page determined to be a target page of the rendering processing in the print job, and transmits, to a printing apparatus, a print job including data of the page for which the rendering processing is performed. A processing time allowed for print processing per page is determined based on capability information indicating a capability of the printing apparatus that is to execute the print job, and the target page is determined based on the determined processing time.

8 Claims, 15 Drawing Sheets

FIG. 5B

| JOB ID 551 | USER ID 552 | FILE STORAGE LOCATION 553 | PRINT SETTING 554 | NUMBER OF PAGES 555 | PDL TYPE 556 | PREDICTED PROCESSING TIME (RENDERING+ TRANSFERRING) 557 | IMAGE INFORMATION (AFTER RENDERING) 558 | PDL DATA 559 |
|---|---|---|---|---|---|---|---|---|
| 1 | 12345 | FILE NAME: AAAAA.doc SAVE DESTINATION:1 | COLOR MODE: BLACK AND WHITE PRINT MODE: ONE SIDE ... | 10 | PCL | P1:12.8s+0.7s P2:1.1s+0.4s P3:0.7s+0.6s ... P9:11.7s+1.2s P10:0.6s+0.5s | P1:AAAAA.P1 2775KBytes P2:- P3:- ... P9:AAAAAA.P9 2866KBytes P10:- | ... |
| 2 | 12345 | FILE NAME: BBBBB.doc SAVE DESTINATION:2 | COLOR MODE: COLOR PRINT MODE: BOTH SIDE ... | 5 | LIPS LX | P1:0.6s+0.5s P2:0.7s+0.6s P3:50.2s+1.6s P4:1.1s+0.4s P5:8.1s+13s | P1:- P2:- P3:BBBBB.P3 4134 KBytes P4:- P5:BBBBB.P5 4268 KBytes | ... |

| SETTING ITEM | SETTING VALUE |
|---|---|
| PAPER SIZE | A4 |
| SHEET CASSETTE | CASSETTE 1 |
| PAPER TYPE | PLAIN PAPER |
| NUMBER OF COPIES | 1 UNIT |
| DOUBLE-SIDED PRINTING | NO |
| ENVISIONED ENGINE SPEED | 50 page/min |
| ENVISIONED RIP CAPABILITY | 1000MHz |

FIG. 9B

| USER ID | APPARATUS ID 1 | APPARATUS ID 2 | APPARATUS ID 3 | APPARATUS ID 4 | APPARATUS ID 5 |
|---|---|---|---|---|---|
| 12345 | 101 | 101 | 102 | 101 | 103 |
| 23456 | 102 | 102 | 102 | 102 | 102 |
| 34567 | 105 | 104 | 103 | 102 | 101 |

FIG. 11

| DOCUMENT | NUMBER OF OBJECTS,PAGE | NUMBER OF OBJECTS,PAGE | ... |
|---|---|---|---|
| ABC.doc | 1000,2 | 1200,4 | |
| DEF.jpg | 1100,1 | | |
| GHI.pdf | 1500,2 | 1300,3 | |

SERVER APPARATUS, METHOD OF CONTROLLING THE SERVER APPARATUS, STORAGE MEDIUM, AND PRINTING SYSTEM THAT DETERMINE WHETHER TO PERFORM, IN THE SERVER APPARATUS, RENDERING PROCESSING ON A PAGE OF A PRINT JOB

This application claims the benefit of Japanese Patent Application No. 2017-163668, filed Aug. 28, 2017, which is hereby incorporated by reference herein in its entirety.

BACKGROUND OF THE INVENTION

Field of the Invention

The present invention relates to a server apparatus, a method of controlling the same, a storage medium, and a printing system, and, in particular, relates to a technique for shortening the time required for rendering processing that a printing apparatus performs on a print job transmitted from a server apparatus.

Description of the Related Art

In recent years, as a configuration in which multiple users share multiple image forming apparatuses (printing apparatuses), a printing system in which a user, rather than designating a printing apparatus uniquely from an information processing apparatus, such as a personal computer (PC), causes a desired printing apparatus to execute printing (referred to as "remote printing") is known. In remote printing, a user, after causing a print job to be transmitted from an information processing apparatus to a print server, operates a desired printing apparatus to cause the printing apparatus to execute the print job. The printing apparatus obtains from a print server the print job instructed by the user, and executes the print job. By virtue of remote printing, the user can select a printing apparatus to use in accordance with the capabilities or operation status of the printing apparatus.

In a case in which, when processing for rendering a print job received from the print server takes a long time on the printing apparatus, however, the user may be made to wait in front of the printing apparatus until the print processing completes. Accordingly, in remote printing, it is desirable to shorten the time that it takes for the printing apparatus to complete print processing. In Japanese Patent Laid-Open No. 2012-186555, as a technique for shortening the time required for rendering processing, a technique for performing print job rendering processing in a print server is proposed. In this technique, both the time that would be required if processing for rendering a print job were to be performed on the print server and the rendered image data were to be transmitted to the printing apparatus, and the time that would be required if the print job were to be transmitted to the image forming apparatus and rendering processing were to be performed on the image forming apparatus are predicted. The print server executes the processing that will be shorter based on the prediction.

In the foregoing conventional technique, however, processing for rendering the print job is not performed until a print instruction is made by the user on the printing apparatus. Accordingly, in the above-described remote printing, a case in which the user will be made to wait in front of the printing apparatus for completion of the print processing may occur due to rendering processing on the print server or the printing apparatus.

Also, in the foregoing conventional technique, it is selected whether to perform processing for rendering the entire print job on the side of the print server prior to transmitting the print job or to perform processing for rendering the entire print job on the side of the printing apparatus after transmitting the print job. It takes a long time, however, to transmit data in the case of transmitting the print job to the printing apparatus after the rendering processing by the print server, since the data amount of the image data to be transmitted will be larger. Meanwhile, in the case of performing processing for rendering the entire print job on the printing apparatus, there is the possibility that the rendering processing will take a long time depending on the print job. Furthermore, the time required for rendering processing in the printing apparatus will differ depending on the capabilities (engine speed, or the like) of the printing apparatus. Accordingly, it is necessary to be able to shorten the time the print processing takes to complete from when the print instruction by the user is performed in the printing apparatus, in conformity with the capabilities of the printing apparatus that executes the print job.

SUMMARY OF THE INVENTION

The present invention was conceived in view of the above described issues. The present invention provides a technique of performing rendering processing partially on a print job on a print server in conformity with the capabilities of a printing apparatus that will execute the print job.

According to one aspect, the present invention provides a server apparatus comprising a memory device that stores a set of instructions, and at least one processor that executes the set of instructions to save a print job received from an external apparatus, to determine, for each page of the saved print job, whether or not to make the page a target of rendering processing in the server apparatus to perform, in accordance with a result of the determination, the rendering processing on a page determined to be the target in the print job, and to transmit, in response to a request from a printing apparatus that is to execute the print job, to the printing apparatus, the print job for which the rendering processing is performed, wherein the determination is executed for each print job based on capability information indicating a capability of the printing apparatus that is to execute the print job.

According to another aspect, the present invention provides a method of controlling a server apparatus, the method comprising saving a print job received from an external apparatus, determining, for each page of the saved print job, whether or not to make the page a target of rendering processing in the server apparatus, performing, in accordance with a result of the determination, the rendering processing on a page determined to be the target in the print job, and transmitting, in response to a request from a printing apparatus that is to execute the print job, to the printing apparatus, the print job for which the rendering processing is performed, wherein the determination is executed for each print job based on capability information indicating a capability of the printing apparatus that is to execute the print job.

According to still another aspect, the present invention provides a non-transitory computer-readable storage medium storing a computer program for causing a computer to execute a method of controlling an image forming apparatus, the method comprising saving a print job received from an external apparatus, determining, for each page of the saved print job, whether or not to make the page a target of rendering processing in the server apparatus, performing, in accordance with a result of the determination, the rendering processing for a page determined to be the target in the print job, and transmitting, in response to a request from a printing apparatus that is to execute the print job, to the printing apparatus, the print job for which the rendering processing is performed, wherein the determination is executed for each print job based on capability information indicating a capability of the printing apparatus that is to execute the print job.

According to yet another aspect, the present invention provides a printing system comprising a server apparatus and a printing apparatus capable of communicating with the server apparatus, wherein the server apparatus comprises a first memory device that stores a set of instructions, and at least one first processor that executes the set of instructions to save a print job received from an external apparatus, to determine, for each page of the saved print job, whether or not to make the page a target of rendering processing in the server apparatus, to perform, in accordance with a result of the determination, the rendering processing on a page determined to be the target in the print job, and to transmit, in response to a request from a printing apparatus that is to execute the print job, to the printing apparatus, the print job for which the rendering processing is performed, wherein the determination is executed for each print job based on capability information indicating a capability of the printing apparatus that is to execute the print job, and wherein the printing apparatus comprises a second memory device that stores a set of instructions, and at least one second processor that executes the set of instructions to make, in accordance with an instruction by a user that has logged in to the printing apparatus, a request to the server apparatus for the print job, and to obtain the print job from the server apparatus, and to execute the obtained print job, wherein, when the print job is executed, the rendering processing is performed on a page for which the rendering processing has not been performed in the server apparatus.

By virtue of the present invention, it becomes possible to perform rendering processing partially on a print job on a print server in conformity with the capabilities of a printing apparatus that will execute the print job. Since it is possible to shorten the print job execution time in the printing apparatus thereby, it is possible to shorten the time that a user waits in front of the printing apparatus for completion of print processing after making the print instruction. Also, since it is possible to prevent rendering processing on a print job from being executed more than necessary on the print server, it becomes possible that the load on the print server will be kept to a minimum, and so it is possible to reduce the load on the printing system.

Further features of the present invention will become apparent from the following description of exemplary embodiments, with reference to the attached drawings.

BRIEF DESCRIPTION OF THE DRAWINGS

FIG. 5B illustrates an example of a print job table.

FIG. 9A illustrates an example of a print setting that can be set on the print server.

FIG. 9B illustrates an example of print history information that the print server holds.

FIG. 11 illustrates an example of a table in which the rendering target page is registered.

DESCRIPTION OF THE EMBODIMENTS

Hereafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Printing System

Figure 1:
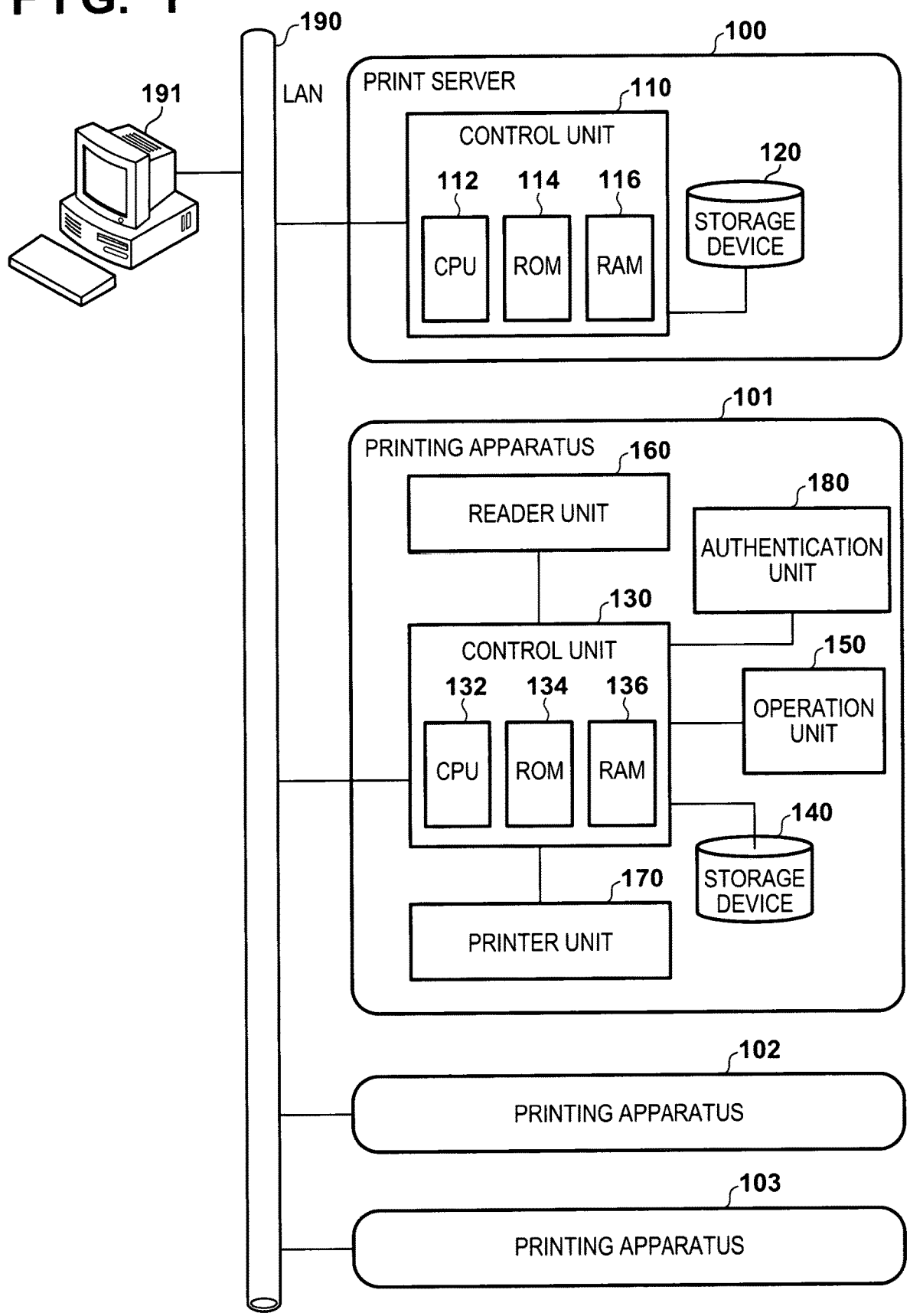
FIG. 1 is a block diagram illustrating an example of a configuration of a printing system.

FIG. 1 is a block diagram that illustrates an example of a configuration of a printing system according to embodiments of the present invention. A print server 100, a plurality of printing apparatuses (image forming apparatuses) 100 to 103, and a personal computer (PC) 191 are connected so as to be able to communicate with each other via a local area network (LAN) 190 in the printing system that is illustrated in FIG. 1. Note, the PC 191 can be configured by a general-purpose computer.

Although the printing apparatuses 101 to 103 are multi function printers (MFPs) in the present embodiment, they may be single function printers (SFPs) or laser beam printers (LBPs) rather than MFPs. Also, the printing apparatuses 101 to 103 may be printers other than MFPs, SFPs, and LBPs. Upon receiving a print instruction from the PC 191, the printing apparatuses 101 to 103 execute printing processing in accordance with the print instruction. Hereafter, only a description of the configuration of the printing apparatus 101 is given, but the printing apparatuses 102 and 103 have the same configuration as the printing apparatus 101.

Printing Apparatus

The printing apparatus 101 includes a control unit 130, a storage device 140, an operation unit 150, a reader unit 160, a printer unit 170, and an authentication unit 180, which are controlled by the control unit 130. The control unit 130 includes a central processing unit (CPU) 132, a read only memory (ROM) 134, and a random access memory (RAM) 136. The CPU 132 controls the entirety of the printing apparatus 101 based on a program that is stored in a storage medium, such as the ROM 134 or the storage device 140.

The RAM 136 is used as a work region of the CPU 132. The CPU 132 loads a program for performing rendering processing into the RAM 136 and executes the program. Note, the printing apparatus 101 may be equipped with dedicated hardware (for example, an image processing circuit) for executing the rendering processing.

The storage device 140 is used as a work region of the CPU 132 and is used for saving various data, such as print data or image data. The operation unit 150, which includes operation keys and a display unit (liquid crystal display (LCD)) that has a touch panel function, displays operation screens on the display unit, and also receives instructions from a user. Upon receiving an instruction from a user, the operation unit 150 makes a notification to the control unit 130 of information indicating the instruction. The reader unit 160, in accordance with an instruction by the control unit 130 (the CPU 132), performs a reading of an image of an original to generate image data. The printer unit 170, in accordance with an instruction of the control unit 130 (the CPU 132), forms (prints) an image onto a sheet (a recording material) based on the image data. The authentication unit 180 obtains information for a user authentication from an identification (ID) card, or the like, and notifies the obtained information to the control unit 130.

Print Server

The print server 100 includes server functions, such as a function for saving a print job that is received from the PC 191 and a function for managing bibliographic information of the saved print job. Note, the print server 100 may be a printing apparatus or an information processing apparatus (such as a PC). In such a case, server functions of the print server 100 are installed in the printing apparatus or information processing apparatus.

The print server 100 is equipped with a control unit 110 and a storage device 120. The control unit 110 includes a CPU 112, a ROM 114, and a RAM 116. The CPU 112 comprehensively controls the entirety of the print server 100 by executing a program that is stored in storage media, such as the ROM 114 or the storage device 120. The RAM 116 is used as a work region of the CPU 112. For example, the CPU 112 loads a program for executing rendering processing into the RAM 116 and executes the program.

Stored Print Job in the Printing System

A printer driver generates a print job based on a print command that is given by an application via the operating system (OS) in the PC 191. The printer driver generates, as a print job, page description language (PDL) data described in a page description language that the printing apparatuses 101 to 103 or the print server 100 can interpret. The PDL data is comprised of PDL commands converted and generated for each print command.

The PC 191 transmits a print job generated by the printer driver to the print server 100 via the LAN 190. In the transmitted print job, user information for enabling identification of the user corresponding to the print job may be included. The print server 100, by saving (storing) print jobs received from the PC 191 on the storage device 120, stores the print jobs.

Upon receiving a request to obtain a print job from any printing apparatus, the print server 100 transmits the print job to the printing apparatus (for example, the printing apparatus 101) via the LAN 190. The printing apparatus 101 makes a request to the print server 100 to obtain a print job identified based on user information of a logged in user. The printing apparatus 101 that received the print job from the print server 100 prints an image on a sheet by executing the received print job. In this way, "stored print" (also referred to as "remote printing") that uses the print server 100 is performed in the printing system.

Processing for Storing Print Jobs

Figure 2A:
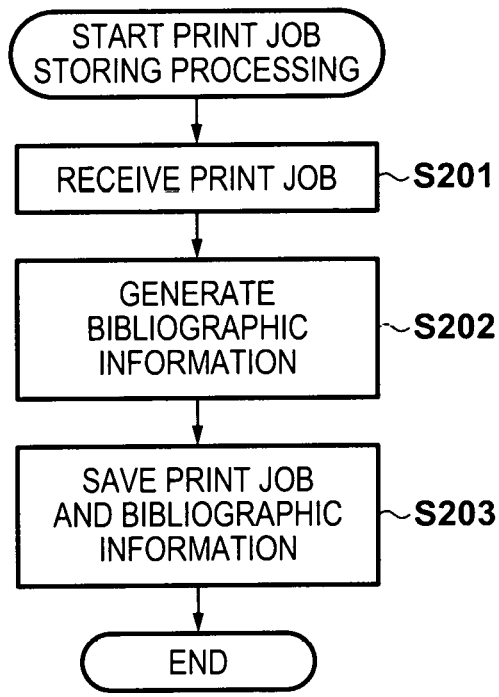
FIG. 2A is a flowchart for illustrating a procedure of processing for storing a print job.
Figure 2B:
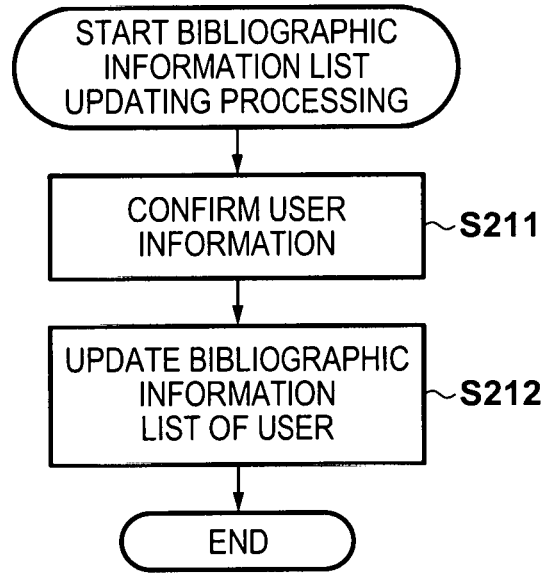
FIG. 2B is a flowchart for illustrating a procedure of processing for updating bibliographic information.

FIG. 2A is a flowchart for illustrating a procedure of processing for storing print jobs in the print server 100, and FIG. 2B is a flowchart for illustrating a procedure of processing for updating a bibliographic information list in the print server 100. The processing of each step of FIGS. 2A and 2B is realized by the CPU 112 loading a program that is stored in the ROM 114 or the storage device 120 into the RAM 116 and executing it.

In step S201, upon receiving the print job from the PC 191 (external apparatus) via the LAN 190, the CPU 112 temporarily saves the received print job in the work region of the RAM 116 or the storage device 120. Next, in step S202, based on the print job within the work region, the CPU 112 generates bibliographic information of the print job. User information, setting information that is not model-dependent (such as an output color mode, a number of copies, single side/double side, and a number of pages), setting information that is model-dependent (such as staples, image processing, a paper feed source, and a discharge destination), and setting information for each page (such as a paper size), for example, may be included in the bibliographic information, but limitation is not made to this. After this, in step S203, the CPU 112 saves the generated bibliographic information and the print job in the storage device 120 and ends the processing.

Also, if the CPU 112 generates the bibliographic information in the procedure of FIG. 2A, it executes processing according to the procedure of FIG. 2B. Specifically, in step S211, the CPU 112 confirms user information included in the generated bibliographic information. Furthermore, in step S212, by the CPU 112 adding the generated bibliographic information to the bibliographic information list of the user corresponding to the user information, the CPU 112 updates that bibliographic information list and ends the processing. Note, the bibliographic information list is saved in the storage device 120. In step S212, in a case where a bibliographic information list of the user corresponding to the user information has not been saved, the CPU 112 newly generates a bibliographic information list and saves it in the storage device 120.

Overview of "Preceding Processing"

Figure 3:
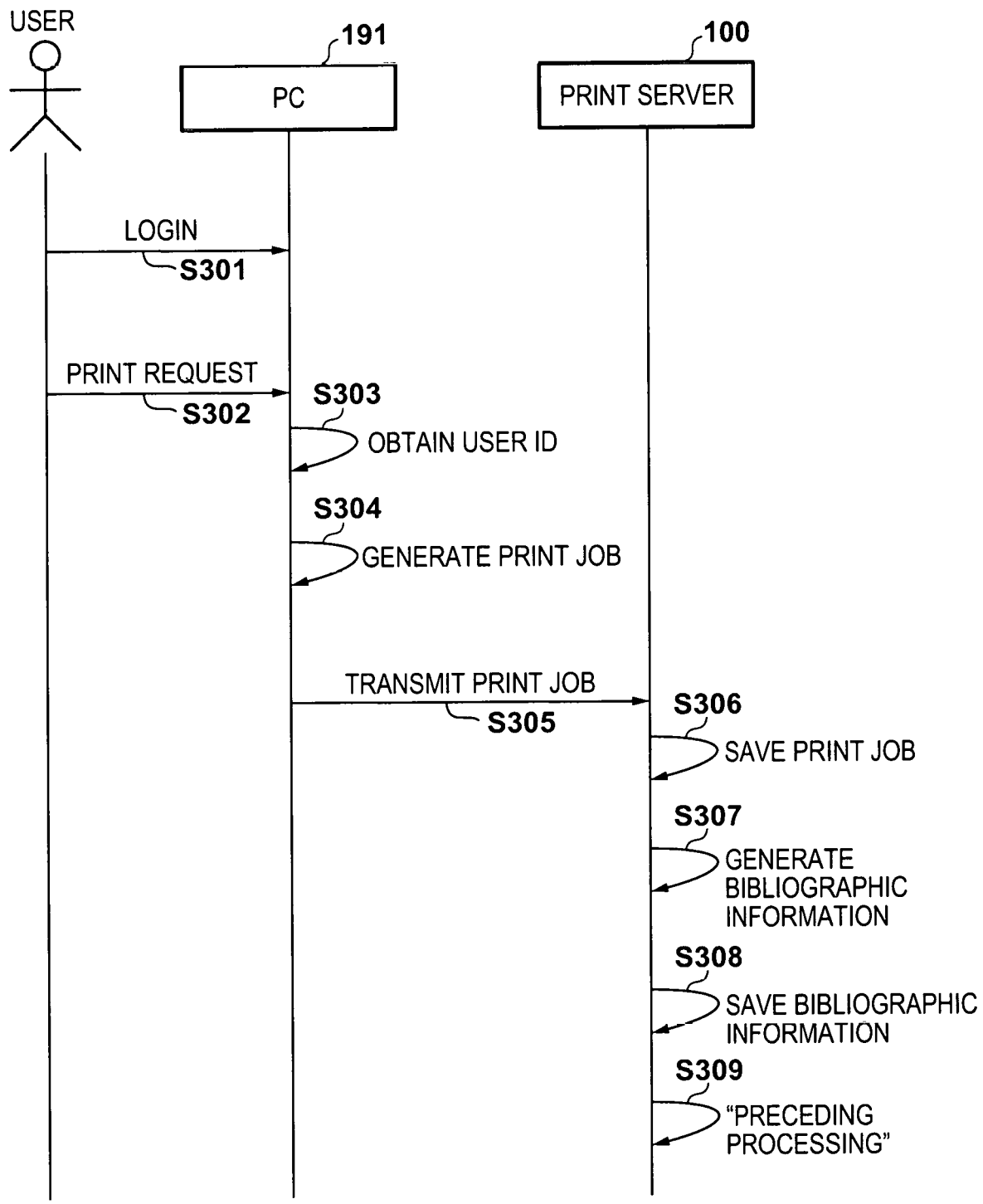
FIG. 3 is a sequence diagram illustrating an example of processing by a PC and a print server when the PC transmits a print job to the print server.

FIG. 3 is a sequence diagram illustrating an example of processing by the PC 191 and the print server 100 when the PC 191 transmits a print job to the print server 100. FIG. 3 illustrates a sequence until a print job is transmitted from the PC 191 to the print server 100 and "preceding processing" is performed on the print job by the print server 100.

In step S301, the user logs in to the PC 191, and then in step S302, the user operates the PC 191 to request printing of data from an arbitrary application. According to the user request, the PC 191 obtains a user ID of the user in step S303, and then, in step S304, generates a print job to which the obtained user ID (user information) is added. After this, in step S305, the PC 191 transmits the generated print job to the print server 100.

When the print server 100 receives the print job from the PC 191, it saves the received print job in the storage device 120 in step S306. Next, in step S307, the print server 100 extracts the user ID (user information) included in the print job and generates bibliographic information of the print job. In step S308, the print server 100 saves the generated bibliographic information in the storage device 120. After saving of the bibliographic information finishes, the print server 100 in step S309 starts "preceding processing", described later using FIG. 6, on the received print job. In the "preceding processing", prior to rendering processing performed by the printing apparatus that executes the print job, a partial rendering process is performed on the print job.

Overview of Print Processing

Figure 4:
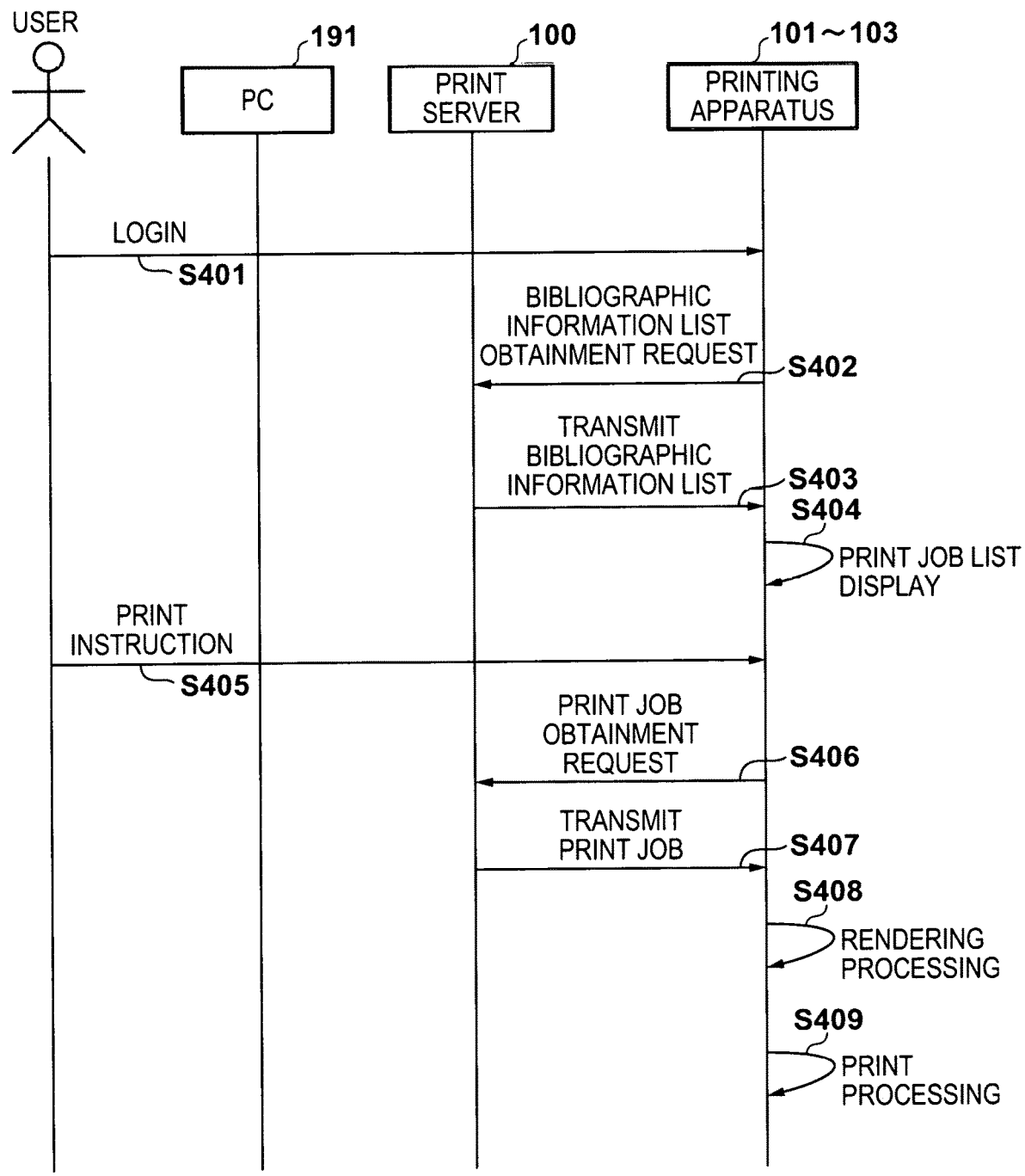
FIG. 4 is a sequence diagram illustrating an example of processing by the print server and a printing apparatus when the printing apparatus receives a print job from the print server.

FIG. 4 is a sequence diagram illustrating an example of processing by the print server 100 and the printing apparatus 101 when the printing apparatuses 101 to 103 receive a print job from the print server 100. FIG. 4 illustrates a sequence until a print job held in the print server 100 is requested by the printing apparatuses 101 to 103 and the print job transmitted from the print server 100 is executed by the printing apparatuses 101 to 103. Note that hereafter, a description is given of an example of a case in which the user logs in to the printing apparatus 101.

In step S401, the user operates the operation unit 150 of the printing apparatus 101 to log in to the printing apparatus 101. If the user logs in to the printing apparatus 101 by succeeding at user authentication by the authentication unit 180, the printing apparatus 101 (the CPU 132) transmits a request to obtain a bibliographic information list to the print server 100 in step S402. In step S403, the print server 100 transmits the bibliographic information list to the printing apparatus 101 as a response to the obtainment request.

Upon receiving the bibliographic information list from the print server 100, the printing apparatus 101, in step S404, displays a list of print jobs on the operation unit 150 based on the received bibliographic information list. In step S405, the user operates the operation unit 150 to designate a particular print job and to instruct execution of printing. If the print instruction by the user is made, the printing apparatus 101, in step S406, transmits a request to obtain a print job to a device, recited in the bibliographic information of the designated print job, on which the designated print job is stored (namely, the print server 100). In step S407, the print server 100 transmits the print job to the printing apparatus 101 as a response to the obtainment request.

Upon receiving the print job from the print server 100, the printing apparatus 101, in step S408, performs processing for rendering the print job, and, in step S409, performs processing for printing image data (drawing data) obtained by the processing for rendering.

Management of Information for "Preceding Processing"

Next, with reference to FIG. 5A and FIG. 5B, management of information used for the "preceding processing" by the print server 100 will be described. The print server 100, in order to manage such information, holds a network table illustrated in FIG. 5A and a print job table illustrated in FIG. 5B in the RAM 116 or the storage device 120.

Figure 5A:
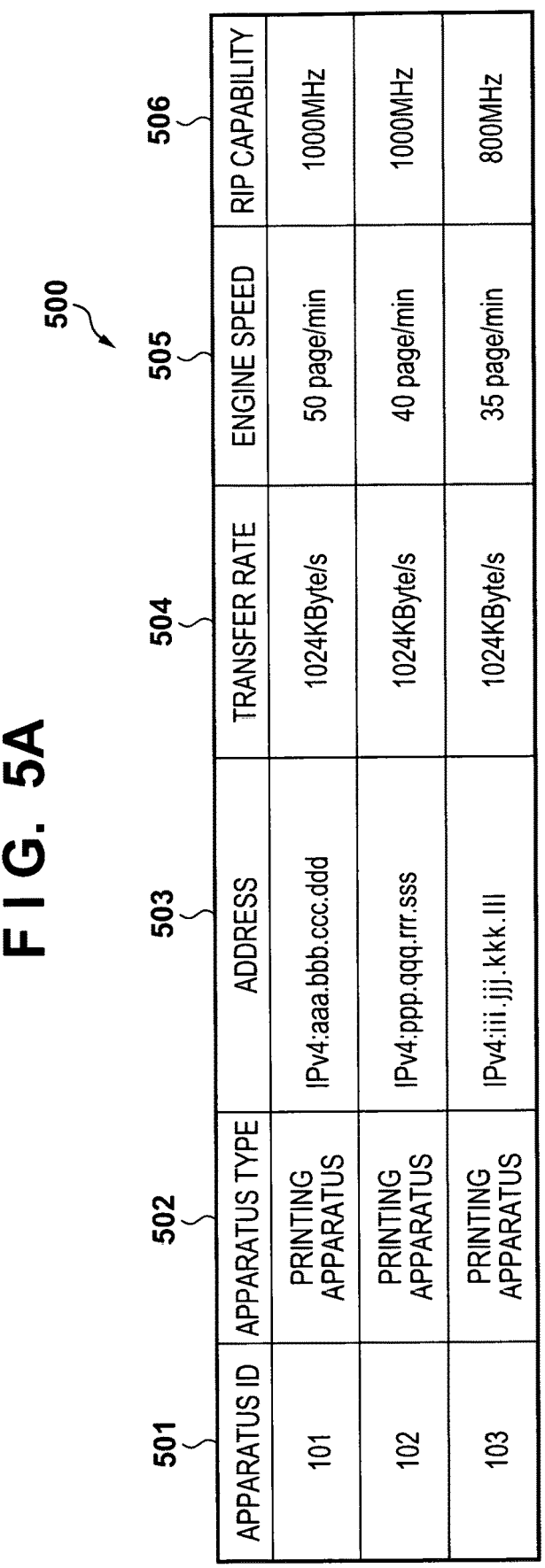
FIG. 5A illustrates an example of a network table.

FIG. 5A illustrates an example of a network table used in the "preceding processing" by the print server 100. The network table 500 holds information of each apparatus that is connected to the print server 100 via the network (the LAN 190). The information held in the network table 500 is configured by an apparatus ID 501, an apparatus type 502, an address 503, a transfer rate 504, an engine speed 505, and a raster image processor (RIP) capability 506.

The apparatus ID 501 is an identifier (ID) of a connected apparatus (target apparatus). The apparatus type 502 indicates the type of the target apparatus, and, in the present embodiment, it indicates a printing apparatus or a server. The address 503 indicates an address (internet protocol (IP) address, or the like) that is assigned to the target apparatus and that is for identifying the target apparatus on a network.

The transfer rate 504 indicates an actual transfer rate for when transferring data between the print server 100 and the target apparatus. In the address 503 and the transfer rate 504 are stored values that are obtained when a target apparatus is activated or when a network connection is established between the print server 100 and a target apparatus.

The engine speed 505 indicates a number of sheets that the printing apparatus can print (output) in a unit time (one minute in the present example) in a case in which the apparatus type 502 is a printing apparatus. The RIP capability 506 indicates a rendering capability (image processing capability) of the printing apparatus in a case in which the apparatus type 502 is printing apparatus. An RIP capability value that indicates the rendering capability of the printing apparatus differs depending on the hardware configuration of the printing apparatus. In the present embodiment, the clock frequency of the CPU of the printing apparatus is used as the RIP capability value. In the present embodiment, the engine speed and the RIP capability of the printing apparatus are examples of parameters that indicate the capabilities of the printing apparatus. Note, in a case in which the apparatus type 502 is a server, no values are stored in the engine speed 505 and the RIP capability 506. This is because the server does not perform print processing.

FIG. 5B illustrates an example of a print job table used in the "preceding processing" by the print server 100. A print job table 550 is a table for managing each print job held on the print server 100. The information held in the print job table 550 is configured by a job ID 551, a user ID 552, a file storage location 553, print settings 554, a number of pages 555, a PDL type 556, a predicted processing time 557, image information 558, and PDL data 559.

The job ID 551 indicates an ID for identifying a print job that is held on the print server 100 (stored on the print server 100). The user ID 552 indicates an ID for identifying a user that corresponds to the print job (the user caused the print job to be transmitted to the print server 100 by operating the PC 191). The file storage location 553 indicates a location at which the print job is actually stored, and includes a file name of a document that is the target of printing in the print job. The print settings 554 indicate print settings applied to the print job. The number of pages 555 indicates the number of pages to be printed by the print job. The PDL type 556 indicates what kind of PDL the description of the print job is based on.

These items 551 to 556 in the print job table 550 include information related to the print job prior to the "preceding processing" being performed. Meanwhile, the item 558 includes information related to the print job for after the "preceding processing" is performed.

The predicted processing time 557 is obtained by predicting the time (rendering time) that will be required for rendering processing on the printing apparatus assumed to execute the print job and the time (transfer time) that will be required to transfer data to the printing apparatus. The predicted processing time 557 is obtained by the sum of the rendering time and the transfer time, which are predicted for each page in the print job. The predicted processing time 557 may be obtained by the processing of step S1003 of FIG. 10, which will be described later. Note that the predicted processing time 557 for a page for which the "preceding processing" was performed may be updated by the processing of step S608 of FIG. 6, which will be described later.

The post-rendering image information 558 indicates saved information for image data of an already rendered page for which rendering processing was performed in the "preceding processing". In the image information 558 are stored the file name and the size corresponding to the image data of the already rendered page. Note that since the image information 558 indicates information related to the image data generated by the rendering processing, the image information 558 may be stored by the processing of step S608 of FIG. 6 in the "preceding processing" as will be described later.

The PDL data 559 is actual PDL data that corresponds to a print job. Prior to the "preceding processing", the PDL data prior to being processed by the "preceding processing" is stored (saved) in the print server 100 in a state in which it is stored in the print job table 550. Meanwhile, after the "preceding processing", the PDL data after being processed by the "preceding processing" is stored (saved) in the print server 100 in a state in which it is stored in the print job table 550.

Note that in the present example, either PDL data prior to being processed by the "preceding processing" or PDL data after being processed is saved, but both PDL data before being processed and after being processed may be saved. In such a case, the print server 100 may be configured so as to transmit to the printing apparatus one of the PDL data items in accordance with the data transfer rate and the predicted transfer time. A configuration may be taken to use a file size stored in the image information 558 and information of the transfer rate 504 included in the network table 500 in such a case to predict the time that it will take to transfer the PDL data after the "preceding processing" and to decide which PDL data to transmit.

"Preceding Processing" on a Print Job

Figure 6:
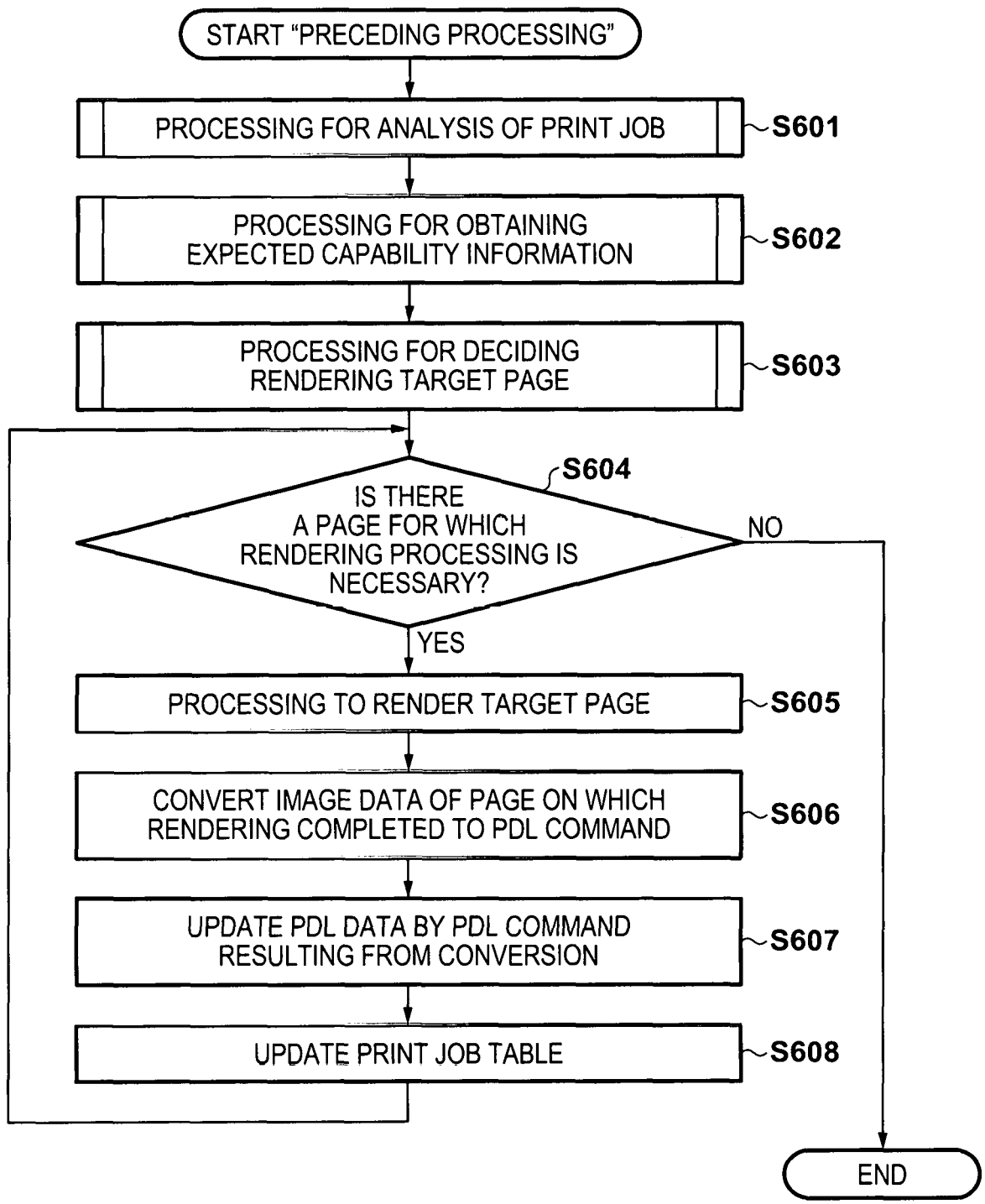
FIG. 6 is a flowchart for illustrating a procedure of "preceding processing" in the print server.

FIG. 6 is a flowchart that illustrates a procedure of "preceding processing" (step S309 of FIG. 3) that is executed in the print server 100, according to the present embodiment. The "preceding processing" is performed on a print job that is stored on the print server 100. The processing of each step of FIG. 6 is realized on the print server 100 by the CPU 112 loading a program that is stored in the ROM 114 or the storage device 120 into the RAM 116 and executing the program.

In step S601, the CPU 112 obtains the number of objects and the data size of each page of a print target in the print job by performing processing for analyzing the print job that is the target of the "preceding processing" and that is stored (saved) in the storage device 120 of the print server 100. Note, the analysis processing in step S601 may be executed by the procedure illustrated in FIG. 7, as will be described later.

Next, in step S602, the CPU 112 performs processing for obtaining capability information, which indicates a capability of a printing apparatus that, it is assumed, will execute the print job. The obtained capability information is used to determine whether or not rendering processing is to be executed in the print server 100 in advance of rendering processing to be performed by the printing apparatus that will execute the print job. Note, capability information obtainment processing in step S602 may be executed by the procedure illustrated in FIG. 8, as will be described later.

Next, in step S603, the CPU 112 performs processing for deciding the page to become the target of rendering processing in the "preceding processing" for the print job. Note, the deciding processing in step S603 may be executed by the procedure illustrated in FIG. 8, as will be described later. In the deciding processing, a page for which the rendering processing will take a long time is identified out of the pages that are the target of printing in the print job, and the identified page is decided as the rendering process target.

In step S604, the CPU 112, based on the result of the processing of step S603, determines whether or not there is a page for which rendering processing is necessary in the "preceding processing" on the print job, and ends the processing in a case in which there is no such page, and advances the processing to step S605 in a case in which there is such a page. Note that in the case of returning the processing from the later-described step S608 to step S604, the CPU 112 determines whether or not there is (there remains) a page for which rendering processing is necessary other than the pages for which rendering processing has completed.

In step S605, the CPU 112 generates drawing data of the target page (image data after rendering processing) by performing the rendering processing on the page that is the target of the rendering processing, and advances the processing to step S606. Furthermore, in step S606, the CPU 112 converts the image data of the already rendered page into PDL commands (FIGS. 12A and 12B), and advances the processing to step S607.

In step S607, the CPU 112 updates the PDL data corresponding to the print job which is the target of transmission to the printing apparatus by a PDL command resulting from the conversion in step S606. Specifically, the CPU 112 substitutes a (pre-rendering) PDL command for the page that is to be target of the rendering processing and that is included in the PDL data with a (post-rendering) PDL command resulting from the conversion. The CPU 112 temporarily saves, in a work region of the RAM 116 or the storage device 120, the print job after the replacement of the updated PDL data (print job).

Next, in step S608, the CPU 112, based on the result of the rendering processing, updates the print job table 550 held in the RAM 116 or the storage device 120. Specifically, the CPU 112 updates the predicted processing time 557, the image information 558, and the PDL data 559 of the print job table 550.

Here, the predicted processing time 557 is obtained for the page for which the above-described rendering processing was performed by predicting the rendering time in the printing apparatus and the time for transferring to the printing apparatus by processing that is similar to step S1003 (FIG. 10), which will be described later. The result of this is that the rendering time will be greatly shortened as compared to before the "preceding processing" is performed. This is because PDL data is reconfigured by the post-rendering image data, and it is not necessary to execute the rendering processing in the printing apparatus. Meanwhile, it is not necessarily the case that the transfer time will become shorter compared to before the "preceding processing" is performed. This is because the transfer time depends on the data size of the PDL commands. Specifically, the transfer time increases when the data size of the PDL command increases due to the rendering processing. It is assumed, however, that the sum of the rendering time and the transfer time (in other words, the predicted processing time) will become shorter than before the "preceding processing" is performed due to the significant reduction in rendering time.

When the CPU 112 completes updating the print job table 550 in step S608, the CPU 112 returns the processing to step S604.

Print Job Analysis Processing (Step S601)

Figure 7:
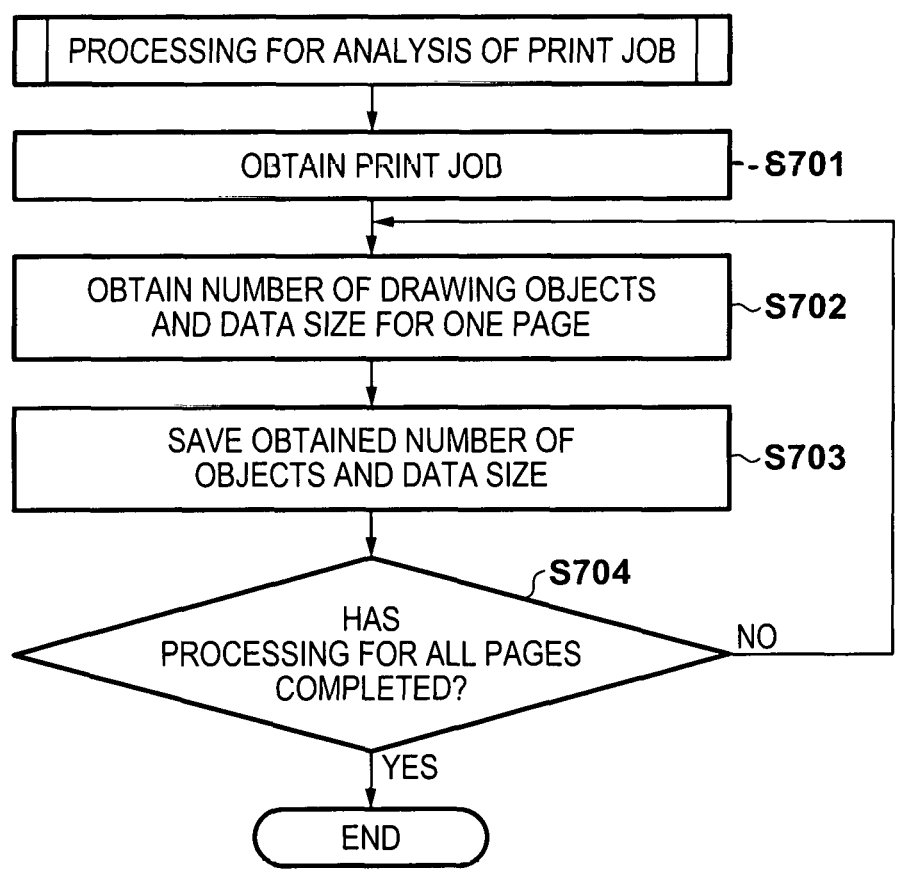
FIG. 7 is a flowchart for illustrating a procedure of processing for analyzing a print job (step S601).

FIG. 7 is a flowchart for illustrating the procedure of processing for analyzing the print job in step S601, according to the present embodiment.

First, in step S701, the CPU 112 obtains a print job that is saved in the storage device 120 and that is to be the target of the "preceding processing". Next, in step S702, the CPU 112 decides the image data of one (unprocessed) page included in the print job to be the processing target, and obtains the number of drawing objects and the data size of the one page by performing processing to generate the drawing objects for the one page. When this generation processing has completed, the CPU 112, in step S703, temporarily saves the obtained number of drawing objects and data size in the work region of the RAM 116 or the storage device 120. After that, in step S704, the CPU 112 determines whether or not processing of all pages in the print job has completed. In a case in which processing of all pages in the print job has not yet completed, the CPU 112 returns the processing to step S702, and, in a case in which it has completed, the CPU 112 ends the processing.

Processing for Obtaining Expected Capability Information (Step S602)

Figure 8:
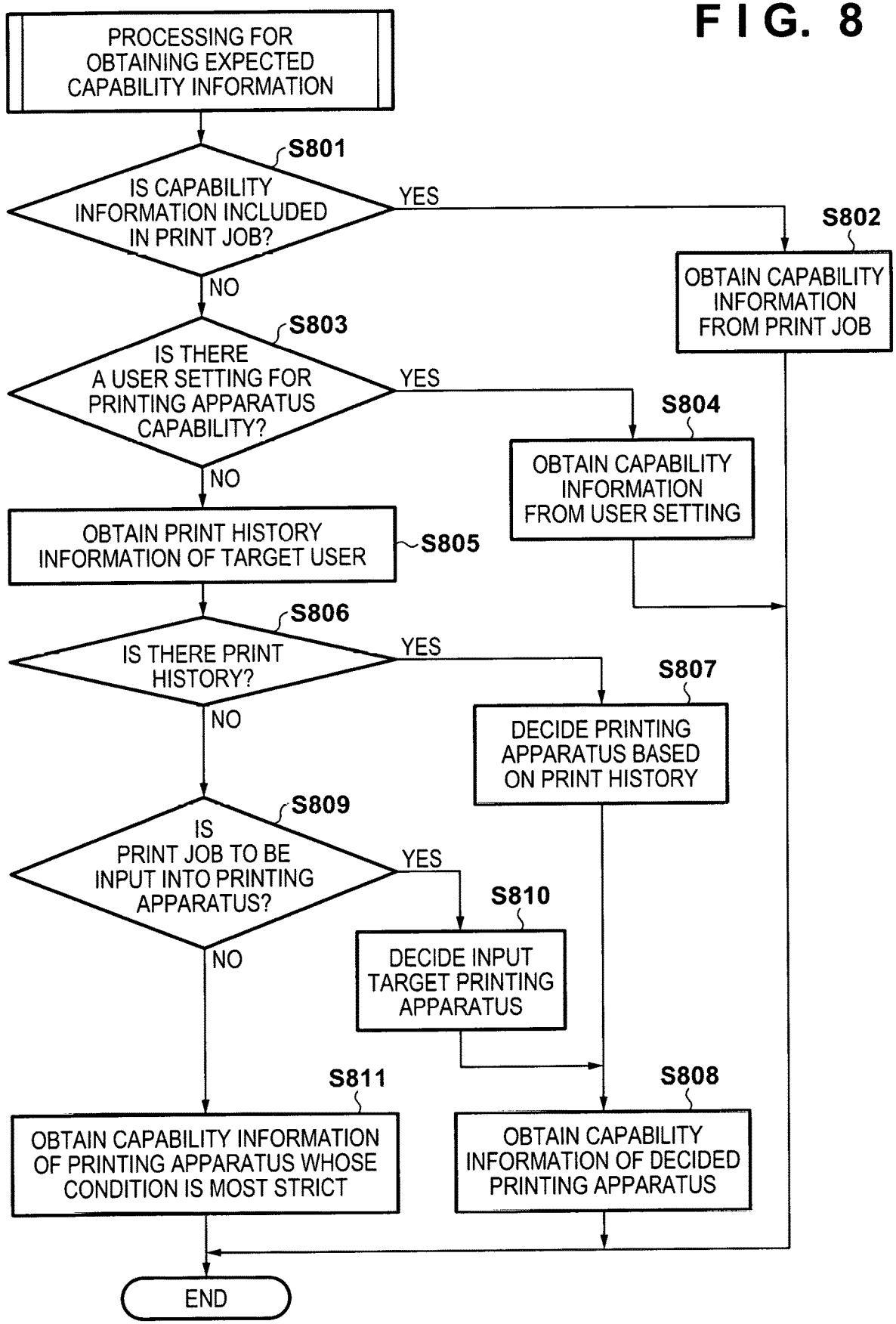
FIG. 8 is a flowchart for illustrating a procedure of processing for obtaining expected capability information (step S602).

FIG. 8 is a flowchart for illustrating the procedure of processing for obtaining the expected capability information in step S602, according to the present embodiment.

In step S801, the CPU 112 determines whether or not capability information (expected capability information) that indicates a capability of the printing apparatus that is assumed to execute the print job is included in the print job saved in the storage device 120 in the print server 100. As will be described later using FIGS. 12A and 12B, it is possible to include in the print job (PDL data) a designation of printing apparatus capabilities as a designation of a command "PrintSpeed" 1202.

In the present embodiment, the CPU 112, in a case in which such a designation is included in the print job, determines that capability information is included in the print job, and advances the processing to step S802. In step S802, the CPU 112 obtains the capability information from the print job and ends the processing. Meanwhile, the CPU 112, in a case in which such a designation of a printing apparatus capability is not included in the print job, determines that capability information is not included in the print job, and advances the processing to step S803.

In step S803, the CPU 112 determines whether or not the printing apparatus capabilities have been set by the user (whether or not there is a user setting). The CPU 112 advances the processing to step S804 in a case in which the printing apparatus capabilities have been set by the user, and advances the processing to step S805 in a case in which they have not been set.

Here, FIG. 9A illustrates an example of print settings that can be set on the print server 100. The print server 100 of the present embodiment is configured so that it is possible for the user to make a setting, as a print setting, to apply to the print job, for each setting item indicated in FIG. 9A. Specifically, it is possible to perform setting of the paper size, the sheet cassette, the paper type, the number of copies, double-sided printing, the envisioned engine speed, and the envisioned RIP capability, and these are only examples.

Among these setting items, the envisioned engine speed and the envisioned RIP capability are setting items that indicate capabilities of the printing apparatus that is assumed to execute the print job. In a case in which "50 pages/minute" is set as the envisioned engine speed, it is assumed that the printing apparatus will perform the printing of 50 sheets per one minute. In a case in which "1000 MHz" is set as the envisioned RIP capability, it is assumed that the clock frequency of the CPU that will perform the rendering processing when printing is 1000 MHz.

The processing is advanced to step S804 in a case in which setting has been made for the envisioned engine speed and the envisioned RIP capability in step S803. In step S804, the CPU 112 obtains the capability information from the user setting and ends the processing. In the present embodiment, the setting values for the envisioned engine speed and the envisioned RIP capability illustrated in FIG. 9A are obtained as capability information indicating the printing apparatus capabilities.

Meanwhile, the CPU 112, in step S805, obtains the print history information for the user (target user) corresponding to the print job, and advances the processing to step S806. Here, FIG. 9B illustrates an example of print history information that is held on the print server 100. The print server 100, for each user, holds the print history information in association with the user ID. In the print history information for each user, the apparatus IDs (apparatus ID1 to apparatus ID5) indicating the last five printing apparatuses that performed printing respectively, in order, from the printing apparatus that last performed printing, are included as a print history for print jobs corresponding to that user. For example, the user whose user ID is "12345" has used the printing apparatus whose apparatus ID is "101" three times, and that printing apparatus is the most used in the last five print jobs. Also, the user whose user ID is "34567" last used the printing apparatus whose apparatus ID is "105". The print history information for each user is updated each time a print job is executed on any printing apparatus (specifically, each time a user makes an instruction to one of the printing apparatuses to execute a print job and the printing apparatus obtains and executes a print job from the print server 100).

In step S806, the CPU 112 determines whether or not there is print history for the target user as the result of obtaining the print history information, and advances the processing to step S807 in a case in which there is a print history. In step S807, the CPU 112, based on the obtained print history information, identifies the printing apparatus that was most frequently used by the target user. Alternatively, the CPU 112 identifies the printing apparatus that was used last if it cannot identify the printing apparatus used most frequently. The CPU 112 decides the identified printing apparatus as the printing apparatus that is assumed to execute the print job, and advances the processing to step S808. In step S808, the CPU 112 obtains from the network table 500 the capability information for the printing apparatus that was decided, and ends the processing. Specifically, the CPU 112 obtains the engine speed and the RIP capability that are stored in the network table 500 in association with the apparatus ID of printing apparatus that it decided.

Meanwhile, in a case in which there is no print history for the target user, the CPU 112 advances the processing from step S806 to step S809. In step S809, the CPU 112, based on the apparatus type 502 of the network table 500, determines whether or not the print job made to be the target is to be input into the printing apparatus. Specifically, the CPU 112 advances the processing to step S810 in a case in which the print server 100 itself is a printing apparatus type, and advances the processing to step S811 in a case in which it is a server type and not a printing apparatus type. In step S810, the CPU 112 decides the print server 100 itself to be the printing apparatus that is assumed to execute the print job, the CPU 112 advances the processing to step S808, and performs the above-described processing.

Also, in step S811, the CPU 112 obtains the capability information of the printing apparatus under the most difficult conditions from the network table 500 and ends the processing. Specifically, the CPU 112 identifies the printing apparatus whose RIP capability value is the lowest in relation to engine speed (RIP capability/engine speed value is the lowest), and obtains the capability information of the identified printing apparatus. In the example of FIG. 5A, the printing apparatus whose apparatus ID is "101" (whose RIP capability/engine speed=20) is identified.

Processing for Deciding Rendering Target Page (Step S603)

Figure 10:
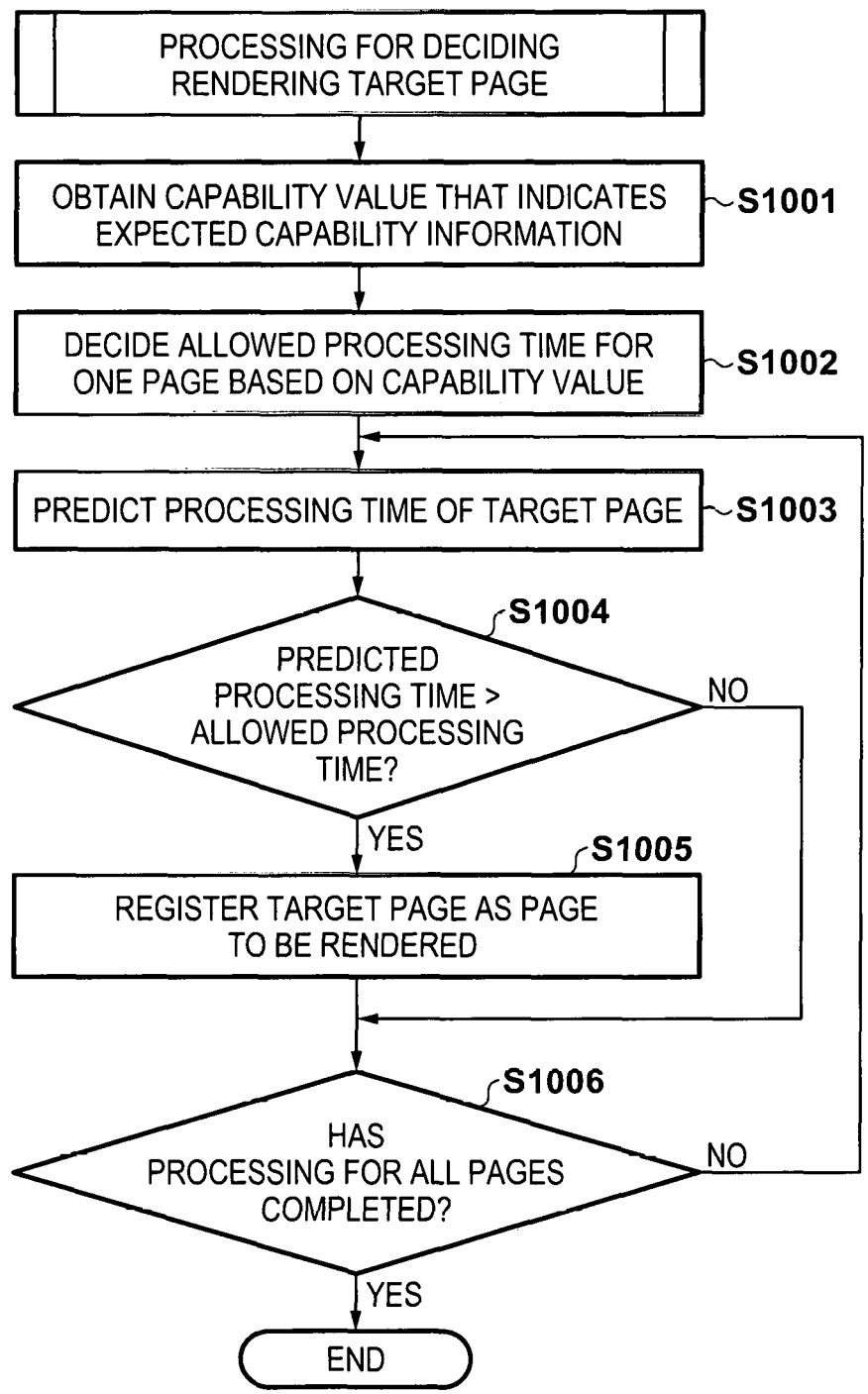
FIG. 10 is a flowchart for illustrating a procedure of processing for deciding a rendering target page (step S603).

FIG. 10 is a flowchart for illustrating the procedure of processing for deciding the rendering target page in step S603, according to the present embodiment.

In step S1001, the CPU 112 obtains a capability value that the expected capability information obtained in the above-described step S602 indicates. Below, an example of a case in which 50 pages/minute and 1000 MHz are obtained as the engine speed and the RIP capability value is described. Next, in step S1002, the CPU 112, based on the obtained capability value, decides the processing time (allowed processing time) allowed for print processing per page. In a case in which the engine speed is 50 pages/minute, the processing time allowed for print processing per page is 1.2 seconds (=60 seconds/50 pages).

After that, the CPU 112, in step S1003, decides one (unprocessed) page included in the print job to be the target of processing, and predicts the time required for print processing (processing time) of the target page. In the present embodiment, the CPU 112 calculates the time (rendering time) required of processing for rendering the target page by using the number of drawing objects and the data size of the target page that were saved in step S703 and the RIP capability value obtained in step S1001. Furthermore, the CPU 112, based on the transfer rate when transferring data to the printing apparatus corresponding to the capability information, calculates the time required for transferring data to the printing apparatus (transfer time). The transfer rate is obtained from the network table 500. The CPU 112 decides the sum of the obtained rendering time and a transfer time as a predicted processing time.

For example, in a case in which an RIP capability value "1 (MHz)" indicates that the processing of a single drawing object can be performed in one second, the RIP capability value "1000 (MHz)" indicates that the processing of 1000 drawing objects requires one second. Note that in the present example, the same weighting is applied to the RIP capability value for all drawing objects, but a configuration may be taken to apply to the RIP capability value different weightings depending on the content of the drawing object. Also, in a case in which the transfer rate is 1024 KByte/second and the data size is 256 KByte, 0.25 seconds is calculated as the transfer time. Accordingly, 1.25 seconds (=1 second+0.25 second) is decided as the predicted processing time.

When the predicted processing time is decided, next, the CPU 112, in step S1004, determines whether or not the predicted processing time of the target page is greater than the allowed processing time (predicted processing time >allowed processing time). The CPU 112, in a case in which the predicted processing time is greater than the allowed processing time, advances the processing to step S1005, and, in a case in which the predicted processing time is not greater than the allowed processing time, advances the processing to step S1006. In step S1005, the CPU 112 registers the target page as a page that is to be the target of rendering (page for which rendering processing is necessary), and advances the processing to step S1006.

Information related to pages that are to be the target of rendering is registered in the table illustrated in FIG. 11. FIG. 11 is a table for holding pages for which rendering processing is necessary in a print job being stored on the print server 100 and the number of drawing objects of the page. This table is stored in the ROM 114 or the storage device 120. In the table of FIG. 11, in association with the document name of the print target according to the print job, the number of the page that is a target of rendering processing in the print server 100 and the number of drawing objects of that page are registered. In the example of FIG. 11, in relation to the document "ABC.Doc", the second page for which the number of drawing objects is "1000" and the fourth page for which the number of drawing objects is "1200" are registered as pages that are to be the target of rendering processing.

After that, in step S1006, the CPU 112 determines whether or not processing of all pages in the print job has completed. In a case in which the processing of all pages in the print job has not yet completed, the CPU 112 returns the processing to step S1003, and, in a case in which it has completed, the CPU 112 ends the processing.

Note that in the example described above, the predicted processing time is decided based on predictions of the rendering time and the transfer time, but it may be that only the rendering time is used for deciding the predicted processing time. Also, parameters indicating printing apparatus capabilities other than the engine speed and the RIP capability may be used for deciding the page that is the target of rendering Configuration of PDL Data FIGS. 12A and 12B illustrate examples of configurations of PDL command groups included in a print job (PDL data) in the present embodiment, and FIG. 12A indicates a PDL command group before "preceding processing," whereas FIG. 12B indicates a PDL command group after "preceding processing".

Figure 12A:
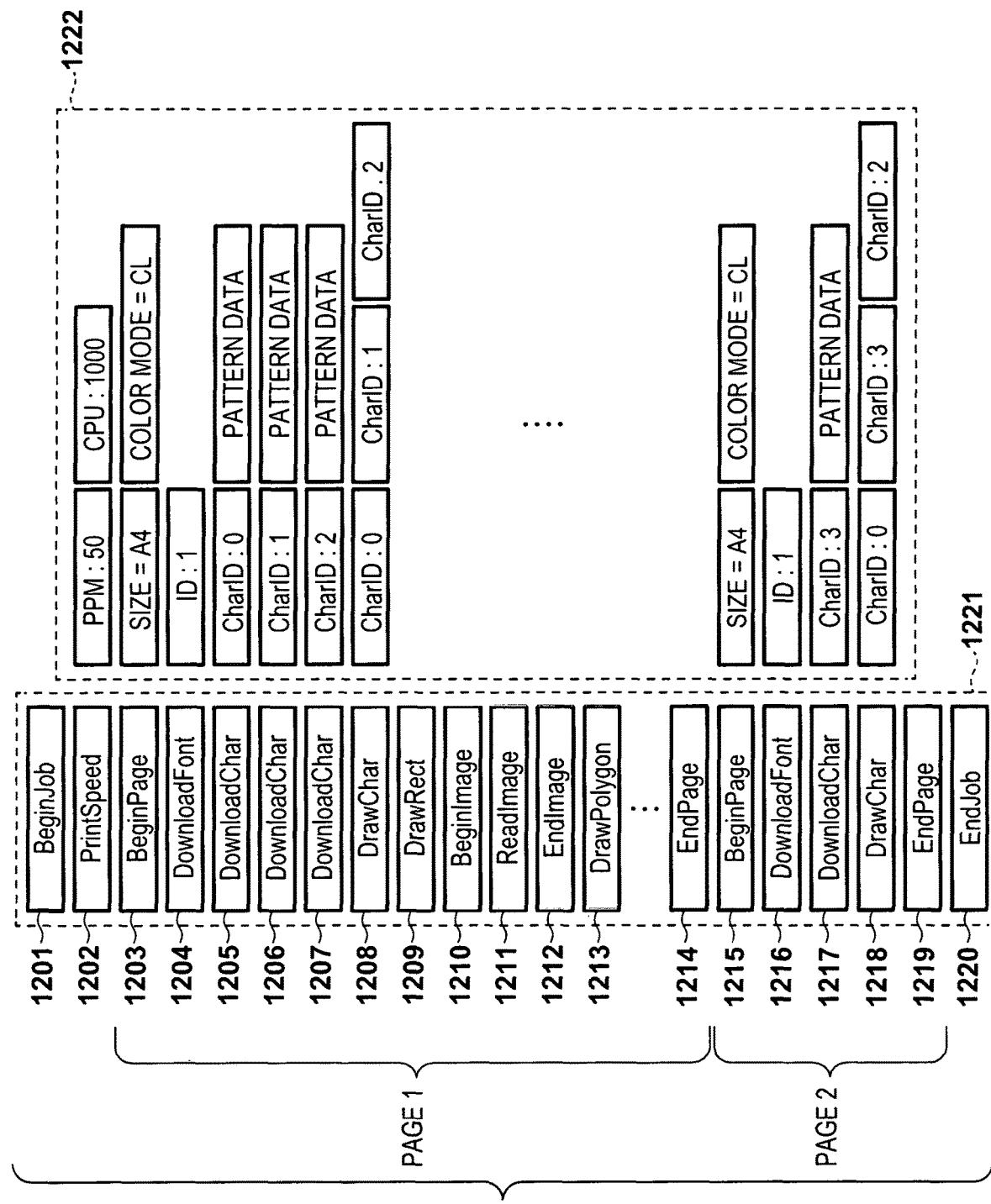
FIG. 12A and FIG. 12B illustrate examples of configurations of page description language (PDL) command groups that are included in a print job (PDL data).
Figure 12B:
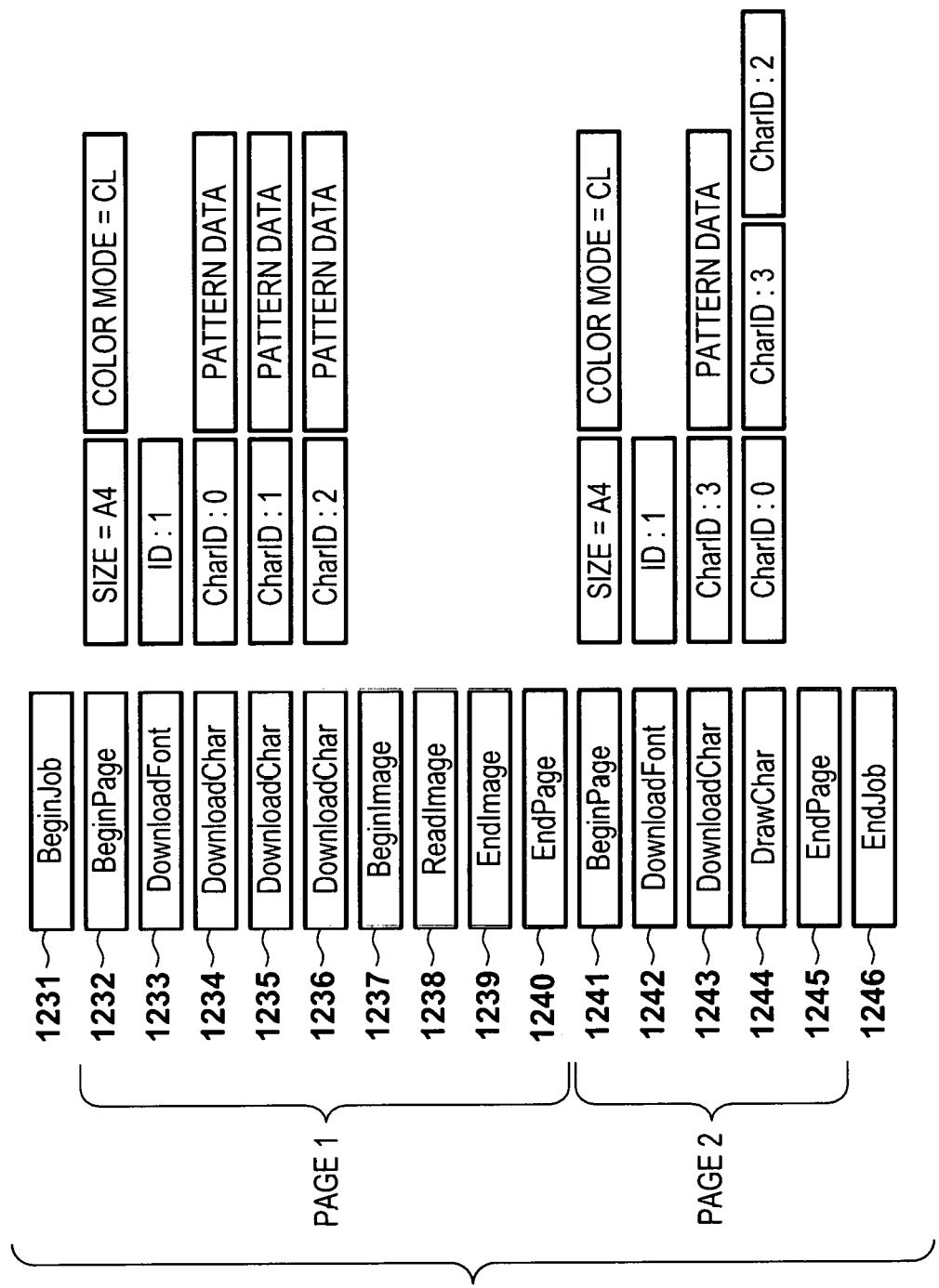

As illustrated in FIG. 12A, the PDL command group prior to the "preceding processing" includes a command group 1221, which was defined in advance based on a PDL language specification, and a parameter group 1222, which includes parameters added to each command that specify instruction content or indicate the details of drawing data. In the parameter group 1222, based on the PDL language specification, for example, necessary items for each command, and items for which an initial value is decided and that may be added as necessary, are present.

In this configuration example, a print job in which the PDL command group, which is for two pages and which is sandwiched between a command "BeginJob" 1201 and a command "EndJob" 1220, which respectively indicate the start and the end of the print job, constitutes a hierarchical structure. Specifically, a two page structure is included in this print job structure. The page start commands "BeginPage" 1203 and 1215 and the page end commands "EndPage" 1214 and 1219, which respectively indicate the start and end of the page description, are respective pairs, and configure two page structures. In these two page structures, a command group used for various drawing processes is included.

Also, in the PDL data of the present embodiment, it is possible to designate a capability of the printing apparatus that is assumed to execute the print job by the command "PrintSpeed" 1202. In the example of FIG. 12A, for the command "PrintSpeed" 1202, parameters indicating that the engine speed is 50 pages/minute (PPM=50) and that the CPU clock frequency is 1000 MHz (CPU=1000) are designated. Note that in a case in which the designation of the printing apparatus capabilities according to the command "PrintSpeed" 1202 is not included, capability information is obtained by another method as described above using FIG. 8.

Here, in FIG. 12A, as an example of a command group for drawing processing, a command group for performing a print job by using font data, which is a resource and which is registered in the storage device 140, is illustrated. Specifically, on page 1, "DownloadFont" 1204, whose parameters are an ID for designating a font and a font header, which is common data, and "DownloadChar" 1205 to 1207, which register font data in units of characters, are included. "DownloadChar" has, as parameters, CharID, which is for specifying a character, and pattern data, which expresses a glyph shape. Additionally, a registered character pattern is printed by the command "DrawChar" 1208, which has CharID as a parameter. Hereafter, a command group for registering or deleting font data for printing a character, as described above, will be referred to as "resource control commands". "DrawChar" is not included, however, in the resource control commands.

Also, in FIG. 12A, as an example of a command group for drawing processing, a command group for printing graphics or images is illustrated. The commands "DrawRect" 1209 and "DrawPolygon" 1213, which are for drawing graphics, can express graphics, such as a rectangle. By the set of three commands "BeginImage" 1210, "ReadImage" 1211, and "EndImage" 1212, which are for drawing an image, a single image can be expressed.

In the PDL data of the present example, the registered font data is effective across a plurality of pages until the deletion instruction is explicitly made by a command or until a job end command is issued (in other words, a resource inheritance level is the job). For that reason, on page 2, by designating font ID=1, which is the same as when the font was registered by the command "DownloadFont" 1216, the same FontSet command as with page 1 is issued, and the font that was registered with page 1 is made to be the target of the processing. Also, the character CharID=3 is registered additionally by the command "DownloadChar" 1217, and the characters (CharID=0, 3, 2), which are registered in page 1 and page 2, are printed by the command "DrawChar" 1218.

Also, in practice, it is normal that various parameters, such as character size, print direction, print color, and qualification designation, are designated, but for simplicity, a description thereof is omitted. As illustrated in the present example, in a case in which the resource inheritance level is the job, the characters (CharID=0, 1, 2) registered by a resource control command can be printed by reference within the subsequent page.

FIG. 12B illustrates a configuration example of PDL data obtained by rendering page 1 first, and then substituting the PDL command prior to rendering for the PDL command after it is converted from the image after rendering. By the processing for rendering page 1, the image after the rendering is converted into the image commands "BeginImage" 1237, "ReadImage" 1238, and "EndImage" 1239. In page 1, since the PDL command is substituted, the PDL command prior to rendering is deleted. Since there is the possibility that the resource control commands 1203 to 1206, which were included in page 1, will be referenced in a page after page 1, however, the resource control commands 1233 to 1236 are not deleted. Consequently, font ID=1, which is the same as when the font was registered, is designated by the command "DownloadFont" 1233, the FontSet command in page 1 is issued, and the font registered in page 1 is made to the target of processing. In page 1, the commands other than the resource control command are deleted, and a substitution by the image commands "BeginImage" 1237, "ReadImage" 1238, and "EndImage" 1239 is made.

Also, in page 2, the characters of page 1 are inherited by the command "DownloadChar" 1234 to 1236, and CharID=3 is additionally registered by the commands "DownloadFont" 1242 and "DownloadChar" 1243. Furthermore, by the command "DrawChar" 1244, the characters (CharID=0, 3, 2) registered on page 1 and page 2 are printed.

As can be seen from FIGS. 12A and 12B, the result of the foregoing "preceding processing" in the print server 100 is that the number of PDL commands for which analysis by the CPU 132 of the printing apparatuses 101 to 103 is necessary is reduced. Accordingly, it is possible to reduce the load of processing for analyzing PDL commands necessary at the time of rendering processing in the printing apparatuses 101 to 103. Also, since image data that has already been rendered is stored as the image commands 1237 to 1239 in the PDL data after the "preceding processing", it is possible to omit the rendering processing by the printing apparatuses 101 to 103 for that image data.

Note, since the resource 1205 (CharID=1) of FIG. 12A is referenced only in page 1, there is no need to leave it as the command 1235, which configures page 2. Even if it is left in this way, however, since it is not necessary to specify the page in which the resource is referenced, it is possible to perform the processing for rendering the print job at a high speed. Also, while the resource control command is such that the resource inheritance level is the job in the examples of FIGS. 12A and 12B, a resource control command for which the resource inheritance level is the page is also possible. Also, with a page for which there is no resource control command, it is possible to substitute a drawing command in the page with all of the image commands 1237 to 1239. In the case of such a page, it is possible to perform the processing for rendering the print job at an even higher speed.

Print Processing by the Printing Apparatus

Figure 13:
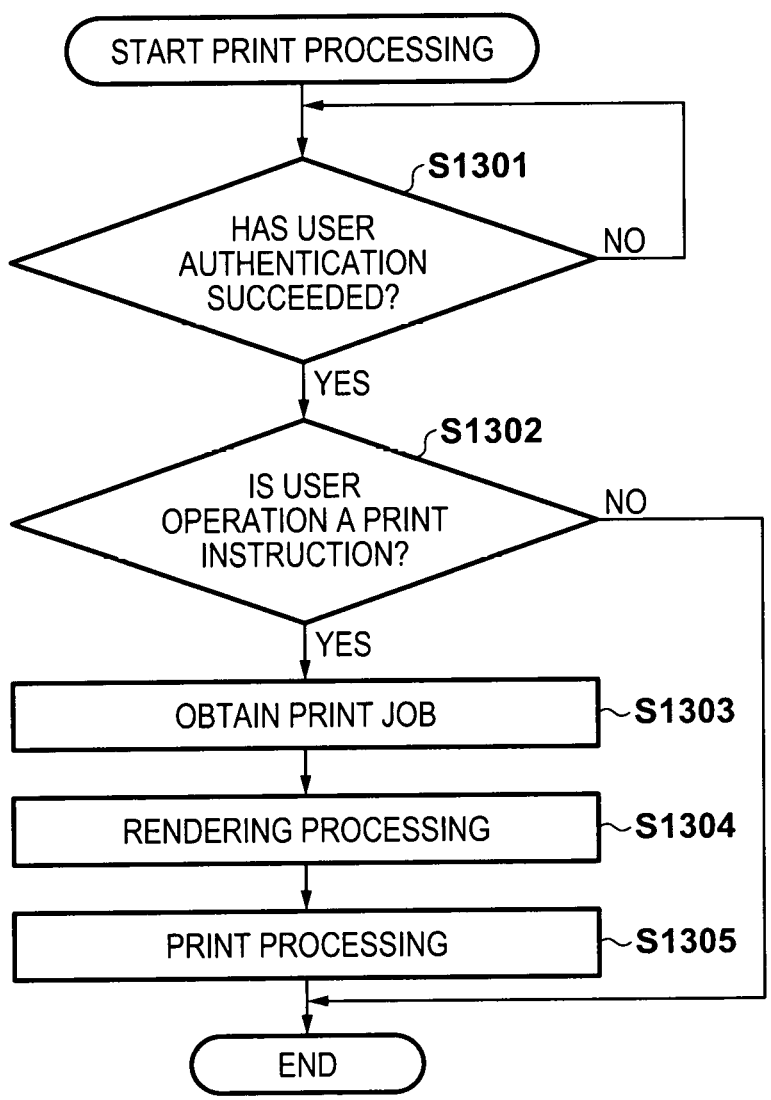
FIG. 13 is a flowchart for illustrating a procedure of print processing on the printing apparatus.

FIG. 13 is a flowchart that illustrates a procedure of print processing that is executed in the printing apparatuses 101 to 103. The processing of each step of FIG. 13 is realized on the printing apparatus 101 by the CPU 132 loading a program that is stored in the ROM 134 or the storage device 140 into the RAM 136 and executing the program. Below, processing in the printing apparatus 101 is described as an example, but processing in the printing apparatuses 102 and 103 is similar.

In step S1301, the CPU 132 performs authentication of the user that logs in to the printing apparatus 101 by using the authentication unit 180. The CPU 132 performs the user authentication (verification against user information that has been registered in the printing apparatus 101 in advance) based on user information that the user input into the authentication unit 180, and, if the user authentication succeeds, advances the processing to step S1302. Note that user information that has been registered in advance may be saved in the RAM 136 or the storage device 140 in the printing apparatus 101. Alternatively, the user authentication may be performed by using user information that has been saved in an external apparatus (for example, the print server 100, the PC 191, or the like), or the input user information may be transmitted to the external apparatus and the user authentication may be performed by the external apparatus.

In step S1302, the CPU 132 determines whether or not a print instruction for the print job is received via the operation unit 150 from the logged in user, and, in a case in which a print instruction is received, advances the processing to step S1303. Meanwhile, the CPU 132, in a case in which an instruction other than the print instruction is received, ends the processing according to the procedure of FIG. 13.

In step S1303, the CPU 132 obtains the print job from the print server 100 by transmitting the request to obtain the print job to the print server 100 via the LAN 190. In this obtainment request, information indicating the user information and the print job that is the target of the print processing is included. Note, prior to transmitting the request to obtain the print job, the CPU 132 obtains the bibliographic information list of the logged in user from the print server 100, and, based on the bibliographic information list, displays a list of print jobs on the operation unit 150. Furthermore, the CPU 132 obtains from the print server 100 a print job selected by the user from the list of print jobs that is displayed.

Next, in step S1304, the CPU 132, based on the obtained print job print settings, generates image data for printing by performing processing for rendering each page to be printed. At this point, the CPU 132 may perform rendering processing for only the pages for which rendering processing has not yet been performed in the "preceding processing" by the print server 100. Because the rendering processing of a page for which the rendering processing takes a long time has been executed in advance by the print server 100, it is not necessary to perform the processing for rendering such a page in the printing apparatus 101. Accordingly, the time needed for rendering processing in step S1304 can be shortened more than in a case in which the "preceding processing" is not performed in the print server 100.

Next, in step S1305, the CPU 132 starts print processing based on the image data after the rendering processing in step S1304. The CPU 132 ends the processing according to the procedure of FIG. 13 when printing to the sheet of the images of all of the pages that are to be printed has completed.

As described above, in the print server 100 of the present embodiment, the CPU 112 saves (stores) the print job received from the external apparatus (for example, the PC 191) in the storage device 120. The CPU 112 determines, for each page of the print job saved in the storage device 120, whether or not to make it the target of rendering processing in the print server 100. Determination of pages to be the target of rendering processing is executed for each print job based on the capability information, which indicates the capabilities of the printing apparatus that executes the print job. The capability information used for this determination is information that indicates the engine speed and the image processing capability of the printing apparatus that executes the print job, for example. The CPU 112, in accordance with the result of the determination, performs rendering processing on a target page in the print job. Furthermore, the CPU 112 transmits to the printing apparatus the print job for which rendering processing was performed in response to the request from the printing apparatus that executes the print job.

In this way, the print server 100, for each print job that is being stored, determines for each page whether or not to perform rendering processing based on the capabilities of the printing apparatus that executes the print job. Accordingly, it is possible, prior to transmission of the print job to the printing apparatus that executes the print job, to perform rendering processing in advance in the print server 100 in a manner that is suitable to the capabilities (the engine speed, or the like) of the printing apparatus. Accordingly, it is possible to shorten the print job execution time in the printing apparatus, and it is possible to shorten the time that the user waits in front of the printing apparatus for print processing to complete. Also, in the print server 100, it is possible to prevent any more execution of rendering processing on a print job than is necessary. Accordingly, it becomes possible to keep the load of the print server 100 to a minimum, and it is possible to reduce the load on the printing system.

OTHER EMBODIMENTS

Other embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of the above-described embodiment and/or that includes one or more circuits (e.g., an application specific integrated circuit (ASIC)) for performing the functions of the above-described embodiment, and by a method performed by the computer of the system or apparatus by, for example, reading out and executing the computer executable instructions from the storage medium to perform the functions of the above-described embodiment and/or controlling the one or more circuits to perform the functions of the above-described embodiment. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A server apparatus comprising:
   (A) a storage device configured to hold a print job received from an external apparatus; and
   (B) at least one controller having at least one processor that executes instructions stored in at least one of at least one memory and at least one circuitry, the controller being configured:
   (a) to determine, for a page of the held print job, whether or not to perform rendering processing in the server apparatus;
   (b) to perform, in accordance with a result of the determination, the rendering processing for a page determined to be a target page of the rendering processing in the print job; and
   (c) to transmit, to a printing apparatus, a print job including data of the page for which the rendering processing is performed,
   wherein the determination is executed based on a value indicating an image processing capability and an engine speed of the printing apparatus that is to execute the print job, and
   wherein a ratio of the value indicating the image processing capability in relation to the engine speed of the printing apparatus is the lowest among corresponding ratios of a plurality of printing apparatuses with which the server apparatus can communicate.

2. The server apparatus according to claim 1, wherein the at least one controller is further configured (d) to obtain the value indicating the image processing capability and the engine speed of the printing apparatus from the print job and to use the obtained value of the image processing capability and the obtained engine speed of the printing apparatus for the determination of the processing time.

3. The server apparatus according to claim 1, wherein the at least one controller is further configured:
(d) to obtain a number of objects and a data size for each page of the print job;
(e) to decide, based on the engine speed, the processing time for print processing of one page by the printing apparatus;
(f) to decide, based on the image processing capability, the number of objects, and the data size, a predicted processing time to be required for print processing of each page of the print job; and
(g) to determine, for each page of the print job, if the predicted processing time is greater than the processing time, the page to be a target page of rendering processing.

4. The server apparatus according to claim 3, wherein the at least one controller is further configured:
(h) to decide, for each page of the print job, based on the image processing capability and the number of objects, a rendering time to be required for rendering processing in the printing apparatus;
(i) to decide, for each page of the print job, based on a transfer rate when transferring data to the printing apparatus and the data size, a transfer time for transferring to the printing apparatus; and
(j) to decide, as the predicted processing time, a sum of the rendering time and the transfer time.

5. A method of controlling a server apparatus, the server apparatus having a storage device configured to hold a print job received from an external apparatus, and at least one controller having at least one processor that executes instructions stored in at least one of at least one memory and at least one circuitry, and being configured to perform the method, the method comprising:
determining, for a page of the held print job, whether or not to perform rendering processing in the server apparatus;
performing, in accordance with a result of the determination, the rendering processing for a page determined to be a target page of the rendering processing in the print job; and
to transmit, to a printing apparatus, a print job including data of the page for which the rendering processing is performed,
wherein the determining is executed based on a value indicating an image processing capability and an engine speed of the printing apparatus that is to execute the print job, and
wherein a ratio of the value indicating the image processing capability in relation to the engine speed of the printing apparatus is the lowest among corresponding ratios of a plurality of printing apparatuses with which the server apparatus can communicate.

6. A non-transitory computer-readable storage medium storing a computer program for causing a computer to execute a method of controlling a server apparatus, the server apparatus having a storage device configured to hold a print job received from an external apparatus, and at least one controller having at least one processor that executes instructions stored in at least one of at least one memory and at least one circuitry, and being configured to perform the method, the method comprising:
determining, for a page of the held print job, whether or not to perform rendering processing in the server apparatus;
performing, in accordance with a result of the determination, rendering processing for a page determined to be a target page of the rendering processing in the print job; and
to transmit, to a printing apparatus, a print job including data of the page for which the rendering processing is performed,
wherein the determining is executed based on a value indicating an image processing capability and an engine speed of the printing apparatus that is to execute the print job, and
wherein a ratio of the value indicating the image processing capability in relation to the engine speed of the printing apparatus is the lowest among corresponding ratios of a plurality of printing apparatuses with which the server apparatus can communicate.

7. A printing system comprising a server apparatus and a printing apparatus capable of communicating with the server apparatus,
wherein the server apparatus comprises:
(a) a storage device configured to hold a print job received from an external apparatus; and
(b) at least one controller having at least one processor that executes instructions stored in at least one of at least one memory and at least one circuitry, the controller being configured:
(i) to determine, for a page of the held print job, whether or not to perform rendering processing in the server apparatus;
(ii) to perform, in accordance with a result of the determination, the rendering processing on a page determined to be a target page of the rendering processing in the print job; and
(iii) to transmit, to the printing apparatus, a print job including data of the page for which the rendering processing is performed,
wherein a processing time allowed for print processing per page is determined based on capability information indicating a capability of the printing apparatus that is to execute the print job, and the target page is determined based on the determined processing time, and
wherein the printing apparatus comprises at least one controller having at least one processor that executes instructions stored in at least one of at least one memory and at least one circuitry, the controller being configured:
(a) to make, in accordance with an instruction by a user that has logged in to the printing apparatus, a request to the server apparatus for the print job, and to obtain the print job from the server apparatus; and
(b) to execute the obtained print job, wherein, when the print job is executed, the rendering processing is performed on a page for which the rendering processing has not been performed in the server apparatus.

8. A server apparatus comprising:
(A) a storage device configured to hold a print job received from an external apparatus; and (B) at least one controller having at least one processor that executes instructions stored in at least one of at least one memory and at least one circuitry, the controller being configured:
- (a) to determine, for a page of the held print job, whether or not to perform rendering processing in the server apparatus;
- (b) to perform, in accordance with a result of the determination, the rendering processing for a page determined to be a target page of the rendering processing in the print job; and
- (c) to transmit, to a printing apparatus, a print job including data of the page for which the rendering processing is performed, wherein the determination is executed based on capability information of a printing apparatus for which a ratio of a value of image processing capability in relation to an engine speed is the lowest among a plurality of printing apparatuses with which the server apparatus can communicate.

* * * * *